(12) United States Patent
Seo et al.

(10) Patent No.: US 8,498,649 B2
(45) Date of Patent: Jul. 30, 2013

(54) METHOD FOR WIRELESS COMMUNICATION BETWEEN USER EQUIPMENT AND BASE STATION IN WIRELESS COMMUNICATION SYSTEM SUPPORTING FIRST USER EQUIPMENT THAT USES SINGLE FREQUENCY BAND AND SECOND USER EQUIPMENT THAT USES PLURALITY OF FREQUENCY BANDS

(75) Inventors: Dong Youn Seo, Anyang-si (KR); Ki Jun Kim, Anyang-si (KR); Joon Kui Ahn, Anyang-si (KR); Dae Won Lee, Anyang-si (KR); Hak Seong Kim, Anyang-si (KR); Jung Hoon Lee, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 332 days.

(21) Appl. No.: 12/996,327

(22) PCT Filed: Oct. 30, 2009

(86) PCT No.: PCT/KR2009/006331
§ 371 (c)(1),
(2), (4) Date: Dec. 3, 2010

(87) PCT Pub. No.: WO2010/050770
PCT Pub. Date: May 6, 2010

(65) Prior Publication Data
US 2011/0098074 A1      Apr. 28, 2011

Related U.S. Application Data

(60) Provisional application No. 61/109,916, filed on Oct. 30, 2008, provisional application No. 61/118,649, filed on Nov. 30, 2008.

(30) Foreign Application Priority Data

Oct. 27, 2009   (KR) ......................... 10-2009-0102369

(51) Int. Cl.
*H04W 72/00* (2009.01)

(52) U.S. Cl.
USPC ........ 455/452.1; 455/447; 455/450; 455/451; 455/453; 370/319; 370/321; 370/324; 370/329; 370/330

(58) Field of Classification Search
USPC ................. 455/428, 432.1–453, 42–46, 509, 455/515–516, 314, 319–334, 337, 344
See application file for complete search history.

(56) References Cited

U.S. PATENT DOCUMENTS

| 6,031,827 A * | 2/2000 | Rikkinen et al. | 370/330 |
| 6,690,939 B1 * | 2/2004 | Jonsson et al. | 455/453 |

(Continued)

FOREIGN PATENT DOCUMENTS

| KR | 20070114619 | 12/2007 |
| KR | 20080039772 | 5/2008 |
| WO | WO 2007/042425 A1 | 4/2007 |

*Primary Examiner* — Dai A Phuong
(74) *Attorney, Agent, or Firm* — McKenna Long & Aldridge LLP

(57) ABSTRACT

A method for wireless communication between user equipments (UEs) and a base station in a wireless communication system that supports a first UE using a single band and a second UE using multiple bands is provided. In the method, UE receives, from the base station, resource allocation information including information regarding a downlink component carrier (CC) and an uplink CC allocated to the UE, receives the allocated downlink CC, and transmits the allocated uplink CC by applying a cell ID thereto. The allocated downlink CC is one of downlink CCs to which different cell IDs are applied, pairs of CCs are predefined by associating uplink CCs respectively with downlink CCs in order to support the first UE. When the allocated downlink and uplink CCs do not belong to the pairs of CCs, the applied cell ID is a cell ID of a downlink CC that is paired with the allocated uplink CC in the predefined pairs of CCs.

9 Claims, 17 Drawing Sheets

U.S. PATENT DOCUMENTS

| | | | |
|---|---|---|---|
| 6,704,572 B1 * | 3/2004 | Whinnett et al. | 455/452.1 |
| RE39,375 E * | 11/2006 | Hamalainen et al. | 370/322 |
| 7,929,925 B2 * | 4/2011 | Luo et al. | 455/101 |
| 8,036,205 B2 * | 10/2011 | Lane et al. | 370/350 |
| 8,369,306 B2 * | 2/2013 | Jung et al. | 370/348 |
| 2004/0228309 A1 * | 11/2004 | Marinier | 370/336 |
| 2009/0086670 A1 * | 4/2009 | Hart et al. | 370/329 |
| 2010/0296410 A1 * | 11/2010 | Kazmi et al. | 370/252 |
| 2011/0243041 A1 * | 10/2011 | Ponnampalam et al. | 370/280 |

* cited by examiner

Symmetric DL/UL CC

Asymmetric DL/UL CC (DL>UL)

Asymmetric DL/UL CC (DL<UL)

Symmetric DL/UL CC

Asymmetric DL/UL CC

METHOD FOR WIRELESS COMMUNICATION BETWEEN USER EQUIPMENT AND BASE STATION IN WIRELESS COMMUNICATION SYSTEM SUPPORTING FIRST USER EQUIPMENT THAT USES SINGLE FREQUENCY BAND AND SECOND USER EQUIPMENT THAT USES PLURALITY OF FREQUENCY BANDS

This application claims the benefit of U.S. Provisional Application No. 61/109,916 filed on Oct. 30, 2008, U.S. Provisional Application No. 61/118,649 filed on Nov. 30, 2008 and Korean Patent Application No. 10-2009-0102369 filed on Oct. 27, 2009 and PCT Application No. PCT/KR2009/006331 filed Oct. 30, 2009, all of which are incorporated by reference in their entirety herein.

TECHNICAL FIELD

The present invention relates to a method for wireless communication between a user equipment and a base station in a wireless communication system that supports a first user equipment that uses a single frequency band and a second user equipment that uses a plurality of frequency bands, and more particularly, to a method for reducing a Cubic Metric (CM) value in a system that supports multiple carriers (which will also be referred to as "multi-carrier").

BACKGROUND ART

(1) Physical Channels of 3GPP Long Term Evolution (LTE) (i.e., Evolved Universal Terrestrial Radio Access (E-UTRA) Rel. 8) System and Method for Transmitting Signals Using the Same FIG. 1 illustrates physical channels used in a 3rd Generation Project Partnership (3GPP) Long Term Evolution (LTE) system, which is an example of a mobile communication system, and illustrates a general method for transmitting signals using the same.

When a User Equipment (UE) is powered on or has entered a new cell, the UE performs an initial cell search process, such as a process for achieving synchronization with a base station, at step S101. The UE may receive a Primary Synchronization CHannel (P-SCH) and a Secondary Synchronization CHannel (S-SCH) from the base station to achieve synchronization with the base station and to obtain information such as a cell ID. Thereafter, the user equipment may receive a Physical Broadcast CHannel (PBCH) from the base station to obtain intra-cell broadcasting information. On the other hand, at the initial cell search step, the UE may receive a downlink Reference Signal (RS) to check a downlink channel status.

A UE, which has completed the initial cell search, may receive a Physical Downlink Control CHannel (PDCCH) and a Physical Downlink Shared CHannel (PDSCH) corresponding to information of the PDCCH to obtain more detailed system information at step S102.

On the other hand, a UE, which has not completed the initial cell search, may perform a random access procedure to complete access to the base station at steps S103 to S106. To accomplish this, the UE may transmit a specific sequence as a preamble through a Physical Random Access CHannel (PRACH) (S103) and may receive a response message in response to the random access through a PDCCH and a PDSCH corresponding to the PDCCH (S104). In the case of contention-based random access, excluding the case of handover, the UE may perform a contention resolution procedure such as a procedure for transmitting an additional PRACH (S105) and receiving a PDCCH and a PDSCH corresponding to the PDCCH (S106).

When the UE has performed the above procedure, the UE may perform, as a general uplink/downlink signal transmission procedure, a procedure for receiving a PDCCH/PDSCH (S107) and transmitting a Physical Uplink Shared CHannel (PUSCH)/Physical Uplink Control CHannel (PUCCH).

(2) Method of Signaling Carrier Frequency Band in LTE System

A 3GPP Long Term Evolution (LTE) (i.e., Evolved Universal Terrestrial Radio Access (E-UTRA) Rel. 8) system has been designed so as to operate in frequency bands as shown in the following Table 1. Table 1 illustrates uplink and downlink frequency bands in E-UTRA.

TABLE 1

| E-UTRA Band | Uplink (UL) BS receive UE transmit $F_{UL\_low}$-$F_{UL\_high}$ | Downlink (DL) BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

As illustrated in Table 1, two different frequency bands are used, respectively, in uplink and downlink in the case of Frequency Division Duplex (FDD) and one frequency band is divided in time into two sections to be used, respectively, in uplink and downlink in the case of Time Division Duplex (TDD). One frequency band (in the case of TDD) and one pair of frequency bands (in the case of FDD) are used for one cell and one base station may have a number of cells which are discriminated spatially or through different frequency bands. In the above Table 1, a channel raster is 100 KHz, which is a central frequency that the UE needs to search for when achieving synchronization with the base station at an initial stage. This indicates that the central frequency of each carrier frequency should be a multiple of 100 KHz.

The sizes of bands and carrier frequencies of uplink and downlink are defined in an E-UTRA Absolute Radio Frequency Channel Number (EARFCN) format and are transmitted through system information. In the case of FDD, different uplink and downlink bands are used in pairs and an EARFCN of the uplink band is transmitted to the UE. In the case where a number of neighboring cells which are discriminated through frequency bands are present, EARFCN information of the bands of the cells is broadcast through system information to enable handover to the cells.

The following Table 2 illustrates channel numbers of frequency bands.

reception is performed through only one frequency band, and transmission and reception is performed through frequency band handover using an inter-frequency handover procedure when transmission and reception is performed through an adjacent frequency band.

TABLE 2

| E-UTRA Band | Downlink | | | Uplink | | |
|---|---|---|---|---|---|---|
| | $F_{DL\_low}$ [MHz] | $N_{\textit{Offs-DL}}$ | Range of $N_{DL}$ | $F_{UL\_low}$ [MHz] | $N_{\textit{Offs-UL}}$ | Range of $N_{UL}$ |
| 1 | 2110 | 0 | 0-599 | 1920 | 13000 | 13000-13599 |
| 2 | 1930 | 600 | 600-1199 | 1850 | 13600 | 13600-14199 |
| 3 | 1805 | 1200 | 1200-1949 | 1710 | 14200 | 14200-14949 |
| 4 | 2110 | 1950 | 1950-2399 | 1710 | 14950 | 14950-15399 |
| 5 | 869 | 2400 | 2400-2649 | 824 | 15400 | 15400-15649 |
| 6 | 875 | 2650 | 2650-2749 | 830 | 15650 | 15650-15749 |
| 7 | 2620 | 2750 | 2750-3449 | 2500 | 15750 | 15750-16449 |
| 8 | 925 | 3450 | 3450-3799 | 880 | 16450 | 16450-16799 |
| 9 | 1844.9 | 3800 | 3800-4149 | 1749.9 | 16800 | 16800-17149 |
| 10 | 2110 | 4150 | 4150-4749 | 1710 | 17150 | 17150-17749 |
| 11 | 1475.9 | 4750 | 4750-4999 | 1427.9 | 17750 | 17750-17999 |
| 12 | 728 | 5000 | 5000-5179 | 698 | 18000 | 18000-18179 |
| 13 | 746 | 5180 | 5180-5279 | 777 | 18180 | 18180-18279 |
| 14 | 758 | 5280 | 5280-5379 | 788 | 18280 | 18280-18379 |
| ... | | | | | | |
| 33 | 1900 | 26000 | 26000-26199 | 1900 | 26000 | 26000-26199 |
| 34 | 2010 | 26200 | 26200-26349 | 2010 | 26200 | 26200-26349 |
| 35 | 1850 | 26350 | 26350-26949 | 1850 | 26350 | 26350-26949 |
| 36 | 1930 | 26950 | 26950-27549 | 1930 | 26950 | 26950-27549 |
| 37 | 1910 | 27550 | 27550-27749 | 1910 | 27550 | 27550-27749 |
| 38 | 2570 | 27750 | 27750-28249 | 2570 | 27750 | 27750-28249 |
| 39 | 1880 | 28250 | 28250-28649 | 1880 | 28250 | 28250-28649 |
| 40 | 2300 | 28650 | 28650-29649 | 2300 | 28650 | 28650-29649 |

In Table 2, carrier frequencies (MHz) and an EARFCN for downlink satisfy the following Mathematical Expression 1.

$$F_{DL} = F_{DL\_low} + 0.1 (N_{DL} - N_{\textit{Offs-DL}}) \quad \text{[MATHEMATICAL EXPRESSION 1]}$$

In Mathematical Expression 1, $F_{DL}$ denotes an upper frequency limit of the corresponding frequency band, $F_{DL\_low}$ a lower frequency limit of the band, $N_{\textit{Offs-DL}}$ denotes an offset value, and $N_{DL}$ of the band denotes a downlink EARFCN.

In Table 2, carrier frequencies (MHz) and EARFCNs for uplink satisfy the following Mathematical Expression 2.

$$F_{UL} = F_{UL\_low} + 0.1 (N_{UL} - N_{\textit{Offs-UL}}) \quad \text{[MATHEMATICAL EXPRESSION 2]}$$

In Mathematical Expression 2, $F_{UL}$, denotes an upper frequency limit of the corresponding frequency band, $F_{UL\_low}$ a lower frequency limit of the band, $N_{\textit{Offs-UL}}$ denotes an offset value, and $N_{UL}$, of the band denotes an uplink EARFCN.

FIG. 2 illustrates an LTE system that uses a single component carrier. In the case of the LTE system, transmission and FIG. 3 illustrates an LTE-Advanced (LTE-A) system that uses multiple carriers. In the case of the LTE-A system, one UE can simultaneously receive a plurality of Component Carriers (CC). As shown in FIG. 3, in the case where component carriers are adjacent to each other, single Fast Fourier Transform (FFT) may be performed on all component carriers for Orthogonal Frequency Division Multiplexing (OFDM) transmission and the resulting signals may then be transmitted after amplification using one power amplifier. Here, if Reference Signals (RSs) of the same pattern are used for all component carriers, there is a problem in that a Cubic Metric (CM) value that affects backoff of the power amplifier is increased.

The following Table 3 illustrates CM values measured when downlink RSs of the same pattern are used for all component carriers.

TABLE 3

| w/o PSF QPSK | | | | | CM OFDM | | | | |
|---|---|---|---|---|---|---|---|---|---|
| | | | | #F-Block | 1 | 2 | 3 | 4 | 5 |
| RS only | 1Tx | | | | 4.02 | 6.57 | 8.59 | 10.13 | 11.32 |
| | 2Tx | Rank1 | ANT1 | | 4.02 | 6.52 | 8.58 | 10.13 | 11.32 |
| | | | ANT2 | | 3.98 | 6.56 | 8.59 | 10.11 | 11.34 |
| | | Rank2 | ANT1 | | 3.98 | 6.52 | 8.59 | 10.15 | 11.35 |
| | | | ANT2 | | 3.98 | 6.52 | 8.61 | 10.13 | 11.35 |
| RS(0 dB) + data | 1Tx | | | | 4.02 | 4.12 | 4.27 | 4.42 | 4.58 |
| | 2Tx | Rank1 | ANT1 | | 3.99 | 4.17 | 4.37 | 4.60 | 4.82 |
| | | | ANT2 | | 3.99 | 4.17 | 4.37 | 4.59 | 4.82 |
| | | Rank2 | ANT1 | | 4.00 | 4.17 | 4.38 | 4.58 | 4.81 |
| | | | ANT2 | | 4.01 | 4.16 | 4.37 | 4.57 | 4.82 |
| RS(3 dB boost) + data | 1Tx | | | | 4.00 | 4.32 | 4.73 | 5.12 | 5.52 |
| | 2Tx | Rank1 | ANT1 | | 4.00 | 4.43 | 4.94 | 5.45 | 5.95 |
| | | | ANT2 | | 4.00 | 4.44 | 4.96 | 5.44 | 5.95 |

TABLE 3-continued

| w/o PSF QPSK | | | | | CM OFDM | | | | |
|---|---|---|---|---|---|---|---|---|---|
| | | | #F-Block | 1 | 2 | 3 | 4 | 5 |
| | | Rank2 | ANT1 | 4.00 | 4.43 | 4.93 | 5.44 | 5.95 |
| | | | ANT2 | 4.00 | 4.44 | 4.95 | 5.46 | 5.95 |
| RS(6 dB boost) + data | 1Tx | | | 4.00 | 4.72 | 5.54 | 6.28 | 6.97 |
| | 2Tx | Rank1 | ANT1 | 4.00 | 4.89 | 5.86 | 6.71 | 7.50 |
| | | | ANT2 | 3.99 | 4.88 | 5.84 | 6.72 | 7.51 |
| | | Rank2 | ANT1 | 4.02 | 4.88 | 5.84 | 6.71 | 7.50 |
| | | | ANT2 | 4.01 | 4.88 | 5.85 | 6.73 | 7.48 |
| RS(9 dB boost) + data | 1Tx | | | 4.01 | 5.25 | 6.52 | 7.58 | 8.50 |
| | 2Tx | Rank1 | ANT1 | 4.00 | 5.42 | 6.79 | 7.95 | 8.92 |
| | | | ANT2 | 4.00 | 5.41 | 6.81 | 7.96 | 8.93 |
| | | Rank2 | ANT1 | 4.02 | 5.41 | 6.79 | 7.98 | 8.91 |
| | | | ANT2 | 3.99 | 5.43 | 6.79 | 7.95 | 8.93 |

As illustrated in Table 3, the CM value only slightly increases as the number of component carriers increases in the case where RSs and data are transmitted with the same power ratio. However, the CM value significantly increases as the number of component carriers increases when transmission is performed after the power of RSs is boosted. Accordingly, there is a need to provide a method for minimizing the increase of the CM value in the multi-carrier system.

DISCLOSURE

Technical Problem

An object of the present invention devised to solve the problem lies on providing a method for communication between a base station and a user equipment without causing an increase in a CM value in a multi-carrier wireless communication system.

Objects of the present invention are not limited to the above object and other objects will be clearly understood by those skilled in the art from the following description.

Technical Solution

The objects of the present invention can be achieved by providing an apparatus/device a method for wireless communication between a user equipment and a base station in a wireless communication system that supports a first user equipment that uses a single frequency band and a second user equipment that uses a plurality of frequency bands, the method including a user equipment receiving, from the base station, resource allocation information including information regarding a downlink component carrier and an uplink component carrier allocated to the user equipment, receiving the allocated downlink component carrier, and transmitting the allocated uplink component carrier by applying a cell ID thereto, wherein the allocated downlink component carrier is one of a plurality of downlink component carriers to which different cell IDs are applied, a plurality of pairs of component carriers are predefined by associating a plurality of uplink component carriers respectively with a plurality of downlink component carriers in order to support the first user equipment, and, when the allocated downlink component carrier and the allocated uplink component carrier do not correspond to any pair of component carriers in the plurality of pairs of component carriers, the cell ID applied to the allocated uplink component carrier is a cell ID of a downlink component carrier that is paired with the allocated uplink component carrier in the plurality of predefined pairs of component carriers.

The allocated downlink component carrier may be used only for the second user equipment.

The resource allocation information may be transmitted through user-specific information.

The objects of the present invention can also be achieved by providing a method for wireless communication between a user equipment and a base station in a wireless communication system that supports a first user equipment that uses a single frequency band and a second user equipment that uses a plurality of frequency bands, the method including the second user equipment being allocated at least one downlink component carrier, and receiving the at least one downlink component carrier, wherein the same cell ID is assigned to the at least one downlink component carrier and a different time offset is assigned to each of the at least one downlink component carrier to allow each of the at least one downlink component carrier to have a different start time point.

The time offset may be in units of subframes.

The objects of the present invention can also be achieved by providing a method for wireless communication between a user equipment and a base station in a wireless communication system that supports a first user equipment that uses a single frequency band and a second user equipment that uses a plurality of frequency bands, the method including the second user equipment being allocated at least one downlink component carrier, and receiving the at least one downlink component carrier, wherein the same cell ID is assigned to the at least one downlink component carrier and a different time delay is assigned to each of the at least one downlink component carrier to allow each of the at least one downlink component carrier to have a different start time point.

The time delay may be a multiple of the reciprocal of a sample rate.

The objects of the present invention can also be achieved by providing a method for wireless communication between a user equipment and a base station in a wireless communication system that supports a first user equipment that uses a single frequency band and a second user equipment that uses a plurality of frequency bands, the method including the second user equipment being allocated at least one downlink component carrier, and receiving the at least one downlink component carrier, wherein the same cell ID is assigned to the at least one downlink component carrier and a different cyclic shift is assigned to each of the at least one downlink component carrier to allow each of the at least one downlink component carrier to have a different start time point.

The cyclic shift may be a multiple of the reciprocal of a sample rate.

Advantageous Effects

In the present invention, different cell IDs are applied to multiple downlink carriers so that downlink refetence signals transmitted through each of the multiple carriers have different patterns, thereby preventing an increase in the CM value due to the use of multiple carriers.

In addition, in the present invention, in the case where the same cell ID is used for multiple downlink carriers, a different time offset, time delay, or cyclic shift is assigned to each of the multiple carriers, thereby preventing an increase in the CM value due to the use of multiple carriers.

Advantages of the present invention are not limited to those described above and other advantages will be clearly understood by those skilled in the art from the following description.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following description will be given with reference to specific terms, the present invention is not necessarily limited to the specific terms and other terms may also be used to indicate the same meanings. The same reference numbers will be used throughout this specification to refer to the same or like parts.

Figure 1:
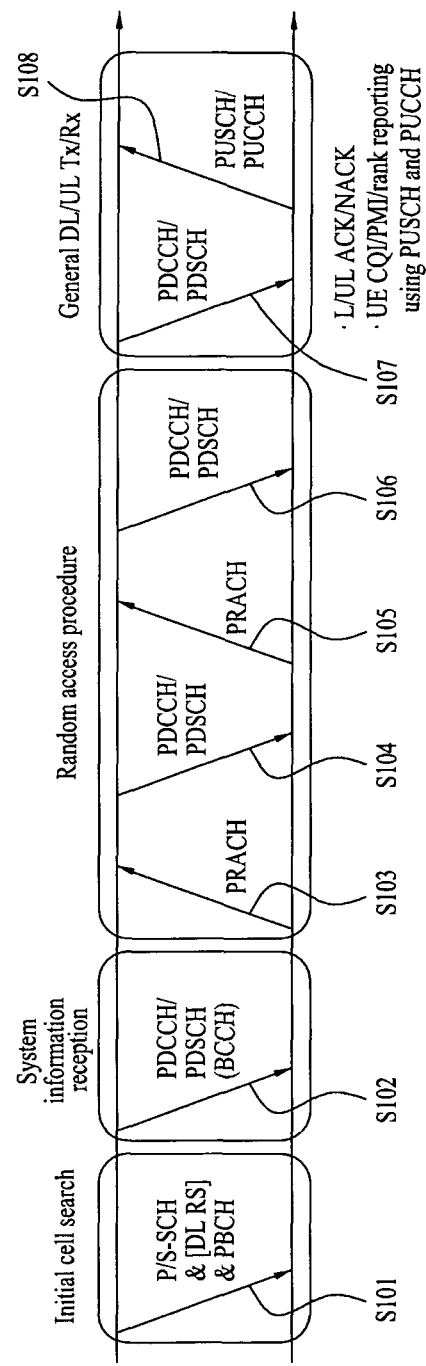
FIG. 1 illustrates physical channels used in a 3rd Generation Project Partnership (3GPP) Long Term Evolution (LTE) system, which is an example of a mobile communication system, and a general method for transmitting signals using the same.
Figure 2:
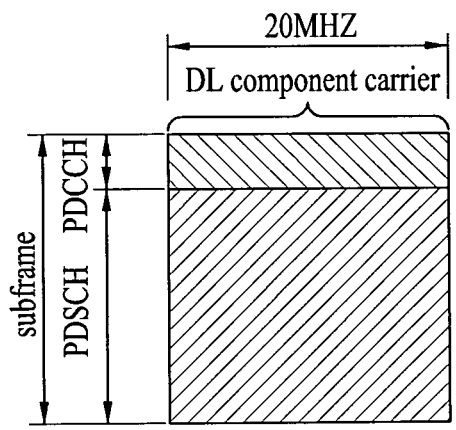
FIG. 2 illustrates an LTE system that uses a single component carrier.
Figure 2:
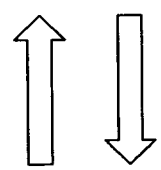
Figure 2:
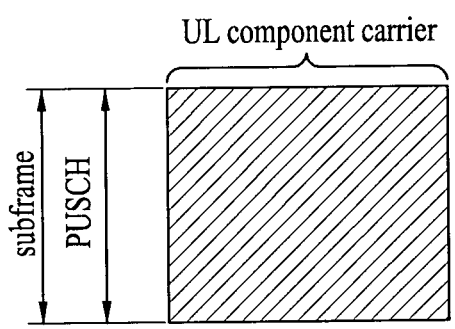
Figure 3:
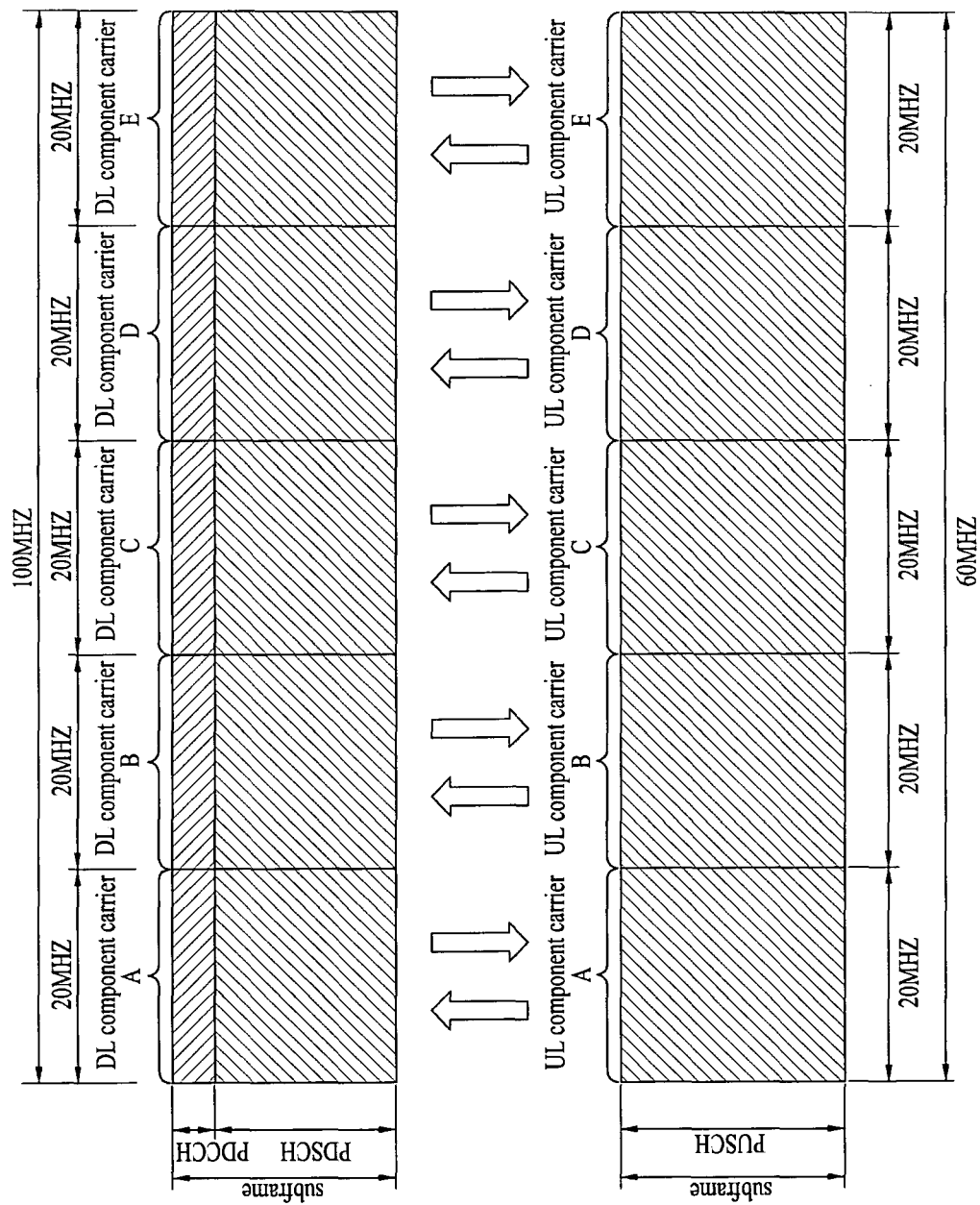
FIG. 3 illustrates an LTE-Advanced (LTE-A) system that uses multiple carriers.
Figure 4:
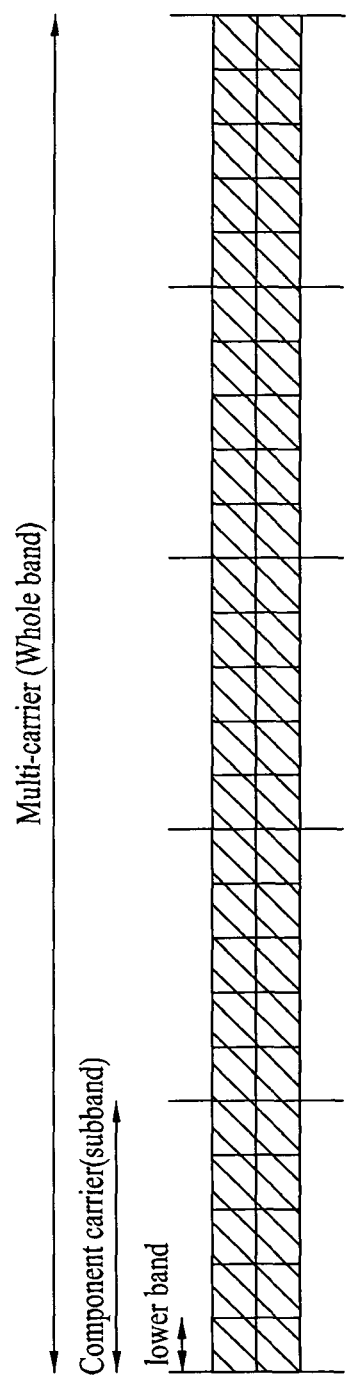
FIG. 4 illustrates a frequency band that is used in a multi-carrier system.

First, a description is given of the concepts of the term "multi-carrier" and the term "component carrier." FIG. 4 illustrates a frequency band that is used in a multi-carrier system. In FIG. 4, the multi-carrier indicates a total frequency band that is used by the base station and has the same meaning as a "whole band." For example, the multi-carrier in the system of the present invention may be 100 MHz.

The component carrier is one of the component carriers that constitute the multi-carrier. That is, a plurality of component carriers constitutes a multi-component carrier through a carrier aggregation. Each component carrier includes a plurality of lower bands. Here, when the term "multi-carrier" is replaced with "whole band," the aggregation of component carriers may be referred to as "bandwidth aggregation." The term "lower band," which indicates a sub-band, may be replaced with "partial band." The carrier aggregation aggregates a plurality of carriers to extend the bandwidth in order to increase data rate. For example, the conventional system uses 20 MHz as one carrier, whereas the system of the present invention may aggregate five 20 Mhz carriers to extend the bandwidth up to 100 MHz. The carrier aggregation includes aggregation of carriers that are located in different frequency bands.

First, a description will be given of a situation in which a conventional UE performs initial access in the case where the system supports multiple carriers (which will also be referred to as "multi-carrier").

Figure 5:
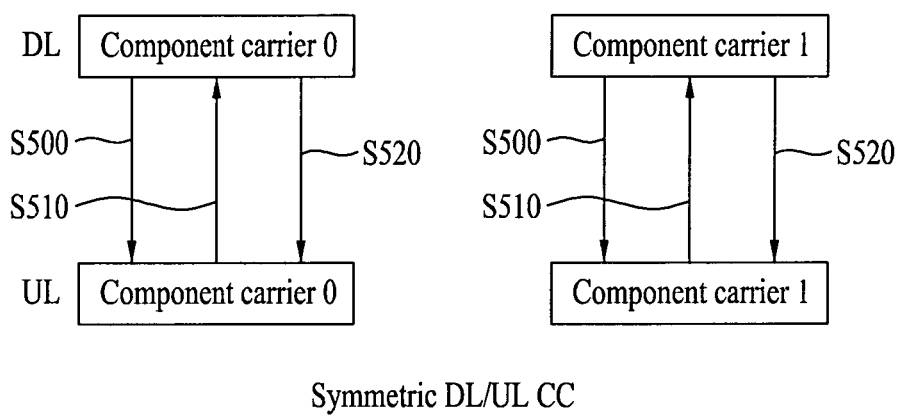
FIG. 5 illustrates a situation in which an LTE UE performs initial access when the number of downlink component carriers is equal to the number of uplink component carriers.

FIG. 5 illustrates a situation in which a conventional UE performs initial access when the number of Down Link Component Carriers (DL CCs) is equal to the number of Uplink Link Component Carriers (UL CCs). In the case of FIG. 5, downlink and uplink component carriers are symmetrical to each other since the number of downlink component carriers and the number of uplink component carriers are equal.

As shown in FIG. 5, first, a base station broadcasts an uplink E-UTRA Absolute Radio Frequency Channel Number (EARFCN), a Physical Random Access CHannel (PRACH) Time-Frequency (TF) slot, and a preamble sequence, which are linked to each downlink component carrier, to the UE (step 500). The UE transmits a PRACH according to the conditions of the TF slot and preamble sequence received from a downlink component carrier linked to an uplink component carrier of the UE (step 510). Here, since the UEs have different uplink component carriers and downlink component carriers are linked respectively to uplink component carriers, no problem occurs even when the TF slots and preamble sequences of two downlink component carriers are equal. The base station transmits an RACH response through a downlink component carrier linked to the uplink component carrier (step 520). Accordingly, all downlink component carriers are accessible by the UE.

Figure 6:
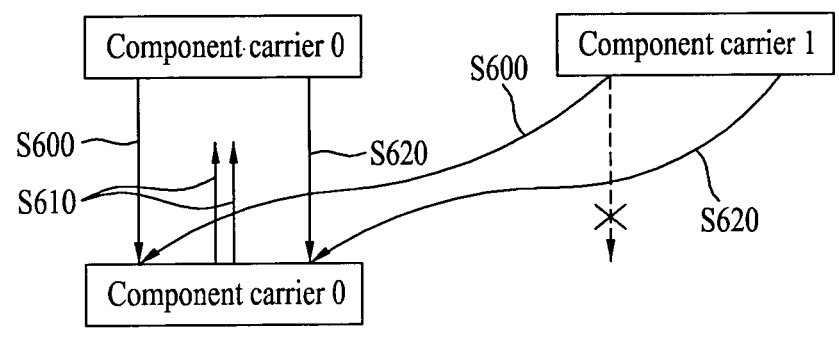
FIG. 6 illustrates a situation in which an LTE UE performs initial access when the number of downlink component carriers is greater than the number of uplink component carriers.

FIG. 6 illustrates a situation in which a conventional UE performs initial access when the number of downlink component carriers is greater than the number of uplink component carriers. In the case of FIG. 6, downlink and uplink component carriers are asymmetrical to each other since the number of downlink component carriers and the number of uplink component carriers are different from each other.

As shown in FIG. 6, first, a base station broadcasts an uplink EARFCN, a PRACH TF slot, and a preamble sequence, which are linked to each downlink component carrier, to the UE (step 600). Since two downlink component carriers (downlink component carrier 0 and downlink component carrier 1) are commonly linked to one uplink component carrier (uplink component carrier 0), the UE transmits a PRACH according to the conditions of the TF slot and preamble sequence received from each of the two downlink component carriers through the same uplink component carrier (step 610). Here, since the two downlink component carriers are linked to the same uplink component carrier, the TF slots and preamble sequences of the two downlink component carriers should be different. The base station transmits an RACH response through a downlink component carrier which matches the TF slot and preamble sequence (step 620). Accordingly, all downlink component carriers are accessible by the UE.

Figure 7:
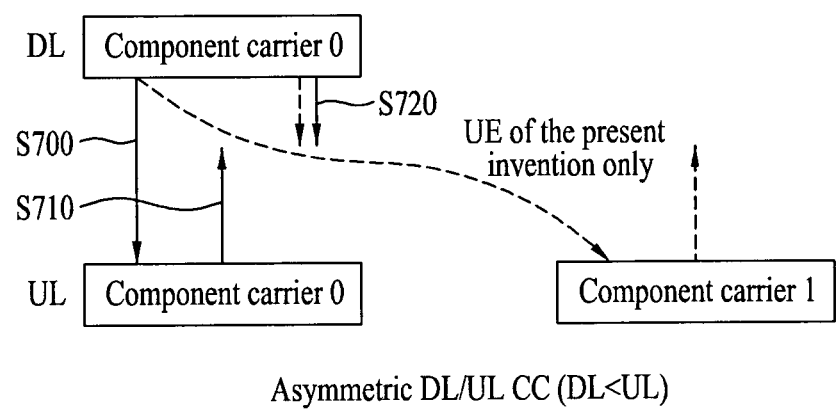
FIG. 7 illustrates a situation in which an LTE UE performs initial access when the number of downlink component carriers is less than the number of uplink component carriers.

FIG. 7 illustrates a situation in which a conventional UE performs initial access when the number of downlink component carriers is less than the number of uplink component carriers. In the case of FIG. 7, downlink and uplink component carriers are asymmetrical to each other since the number of downlink component carriers and the number of uplink component carriers are different from each other.

As shown in FIG. 7, first, a base station broadcasts an uplink EARFCN, a PRACH TF slot, and a preamble sequence, which are linked to each downlink component carrier, to the UE (step 700). The UE transmits a PRACH according to the conditions of the TF slot and preamble sequence received from a downlink component carrier linked to an uplink component carrier of the UE (step 710). Here, since UEs have different uplink component carriers and downlink component carriers are linked respectively to uplink component carriers, no problem occurs even when the TF slots and preamble sequences of two downlink component carriers are equal. The base station transmits an RACH response through a downlink component carrier linked to the uplink component carrier (step 720). Here, in the case where the number of downlink component carriers is less than the number of uplink component carriers, the UE cannot use uplink component carriers remaining after downlink component carriers and uplink component carriers are paired since only one uplink EARFCN is present. Accordingly, such a component carrier (uplink component carrier 1 in FIG. 7) cannot be used as a component carrier for the conventional UE.

In the conventional system, one frequency band is defined as one cell. Accordingly, as a method for discriminating cells, a unique Global Cell Identify (GCI) may be allocated to each cell and a Physical Cell Identity (PCI) can be allocated to each cell for identification of the cell according to the characteristics of the physical layer. The PCI includes 504 IDs and is applied to uplink functions. The cell ID affects downlink Reference Signal (RS) pattern, Physical Uplink Shared CHannel (PUSCH) hopping pattern, Physical Uplink Control CHannel (PUCCH) RS pattern, and RS group hopping pattern. The downlink RS pattern, PUSCH hopping, PUCCH RS pattern, and RS group hopping pattern are determined according to the cell ID.

In the following description, a cell ID indicates a PCI.

A description will now be given of methods for avoiding the problem of an increase in the Cubic Metric (CM) when the same downlink RS pattern is repeatedly used for the multi-carrier described above.

Embodiment 1

In the case where the same cell ID is used for all downlink component carriers, the CM increases since the same downlink RS pattern is applied to all downlink component carriers. This embodiment suggests that a different cell ID be assigned to each downlink component carrier in order to overcome this problem.

In the conventional system, the pattern of the downlink RS is determined by the cell ID. Therefore, if different cell IDs are assigned to downlink component carriers, the downlink RS patterns of downlink component carriers are different so that it is possible to overcome the problem of an increase in the CM.

Figure 8:
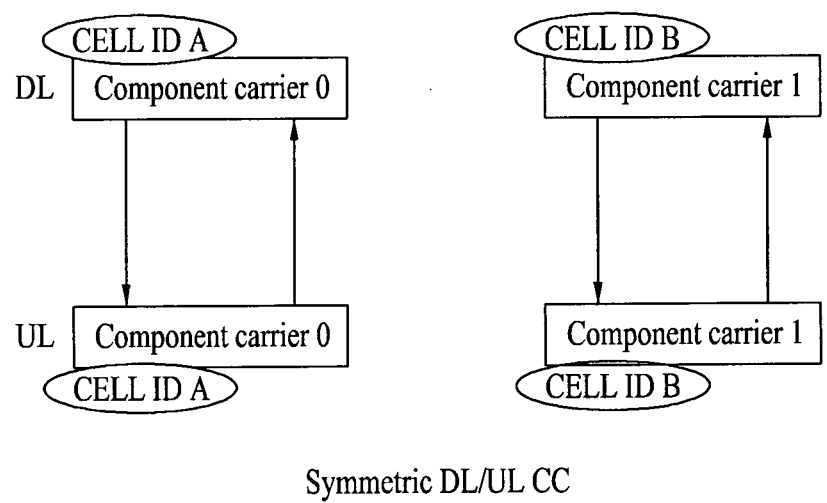
FIG. 8 illustrates a link relation between uplink and downlink component carriers when the number of downlink component carriers is equal to the number of uplink component carriers.

FIG. 8 illustrates a link relation between uplink and downlink component carriers when the number of downlink component carriers is equal to the number of uplink component carriers. As shown in FIG. 8, if the number of downlink component carriers is equal to the number of uplink component carriers, no problem occurs since downlink component carriers are independently linked respectively to uplink component carriers.

Figure 9:
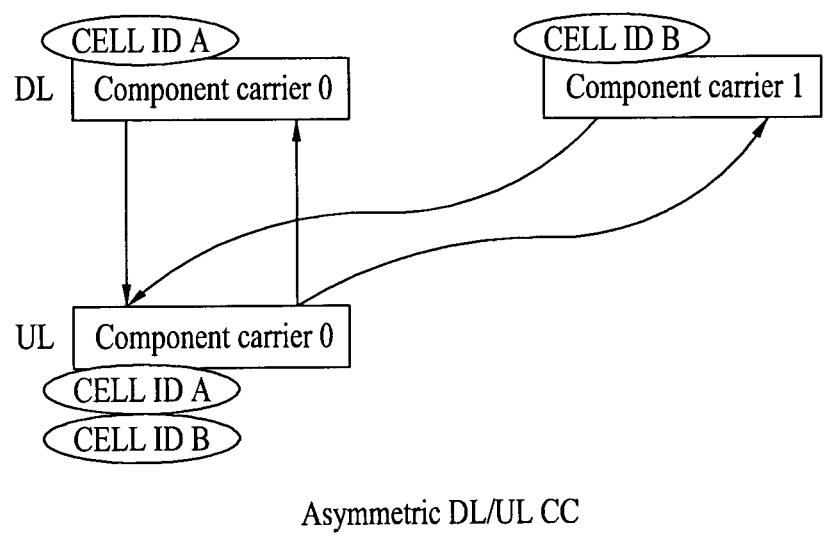
FIG. 9 illustrates a link relation between uplink and downlink component carriers when the number of downlink component carriers is greater than the number of uplink component carriers.

However, a problem may occur if the number of downlink component carriers is greater than the number of uplink component carriers. FIG. 9 illustrates a link relation between uplink and downlink component carriers when the number of downlink component carriers is greater than the number of uplink component carriers. As shown in FIG. 9, in the case where the number of downlink component carriers is greater than the number of uplink component carriers, operations of cell-ID-based uplink functions of the UE of the present invention which has received a cell ID A through a downlink component carrier 0 may contend (or collide) with those of the UE of the present invention which has received a cell ID B through a downlink component carrier 1.

Examples of the uplink functions to which the cell ID is applied include Physical Uplink Shared CHannel (PUSCH) Type 2 hopping, Physical Uplink Control CHannel (PUCCH) RS sequence generation, and RS group hopping.

The PUSCH is divided into a predetermined number of subbands and data thereof is transmitted while hopping between the subbands in the case where hopping is applied to the subbands. That is, when consequent Virtual Resource Block (VRBs) indices are allocated, each VRB index is immediately mapped to a Physical Resource Block (PRB) and resources thereof are used for data transmission in the case where hopping is not applied. On the other hand, VRB resources that are mapped to a PRB according to a predefined hopping rule are used for data transmission in the case where hopping is applied. The PCI is used when the hopping pattern is generated and the hopping pattern changes if the PCI changes.

Similarly, the PCI is applied to PUCCH RS pattern and RS group hopping pattern, and the PUCCH RS pattern and RS group hopping pattern change.

Contention may occur between uplink component carrier resources of the UEs using different cell ID when performing PUSCH type 2 hopping, PUCCH RS sequence generation, and RS group hopping illustrated above.

As a method for overcoming this contention, we can consider a method in which PUSCH type 2 hopping is not used, different PUCCH frequency resources are allocated to UEs identified with different cell IDs, and Spatial Division Multiplexing (SDM) is not performed on different cell IDs. However, this method has a problem in that use of resources is inefficient and scheduling is complicated. Accordingly, it is useful to employ a method in which downlink component carriers are individually paired with uplink component carriers, respectively, and downlink component carriers remaining after such pairing, which will be referred to as "remnant downlink component carriers", are used only for the UE of the present invention.

Here, there is a problem as to how to use remnant downlink component carriers in order to prevent contention between resources of uplink component carriers described above. The present invention suggests the following method to overcome this problem.

In the case where downlink component carriers correspond respectively to uplink component carriers and pairs of downlink and uplink component carriers can be configured for the conventional UE and the UE of the present invention, links between the downlink and uplink component carriers are referred to as "prime links" and pairs of remnant downlink component carriers and uplink component carriers are referred to as "sub-links". Here, it is assumed that sub-links cannot be configured for the conventional UEs. The above described E-UTRA frequency bands may be used as the prime links.

The present invention suggests two main methods, a flexible method and a fixed method, for configuring a sub-link to overcome the problem of contention of uplink component carrier resources described above.

The flexible sub-link configuration method and the fixed sub-link configuration method are described as follows.

Figure 10:
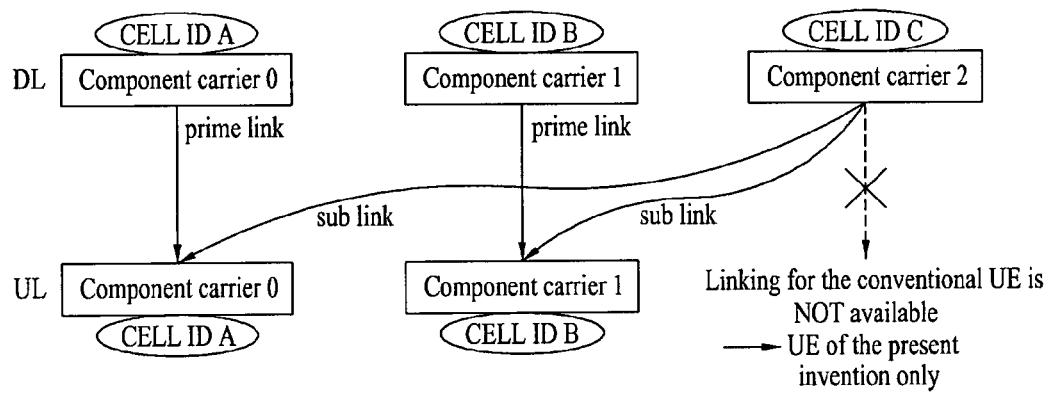
FIG. 10 illustrates a first example of the method for configuring flexible sub-links for LTE-A UEs according to an embodiment of the present invention.

The following is a description of a first example of the flexible sub-link configuration method. FIG. 10 illustrates the first example of the method for configuring flexible sub-links for the UEs of the present invention according to an embodiment of the present invention. In the case of FIG. 10, the number of downlink component carriers is 3 and the number of uplink component carriers is 2 such that the downlink and uplink component carriers are asymmetric.

In addition, as shown in FIG. 10, a downlink component carrier 0 and a downlink component carrier 1 are linked respectively to an uplink component carrier 0 and an uplink component carrier 1 and the links can be defined as prime links for both the conventional UEs and the UEs of the present invention. A base station broadcasts each neighboring downlink component carrier and a prime link of each downlink component carrier using an EARFCN. The UE that uses an uplink component carrier uses a cell ID of a downlink component carrier prime-linked to the uplink component carrier.

On the other hand, in the method for configuring flexible sub-links for the UEs of the present invention, a remnant downlink component carrier may be linked to an uplink component carrier for each UE of the present invention according to uplink component carrier load. In the example of FIG. 10, the downlink component carrier 2 is linked to the uplink component carrier 0 for the UE through a sub-link. The sub-link is transmitted through a UE-specific signal. Here, the UE uses a cell ID of a downlink component carrier prime-linked to the uplink component carrier to which the remnant downlink component carrier is sub-linked.

For example, in the case where the downlink component carrier 0 is prime-linked to the uplink component carrier 0, the UE that uses the uplink component carrier 0 uses a cell ID A. On the other hand, in the case where the downlink component carrier 2 is sub-linked to the uplink component carrier 0, the UE uses the cell ID A of the downlink component carrier 0 prime-linked to the uplink component carrier 0, instead of using a cell ID C of the downlink component carrier 2 sub-linked to the uplink component carrier 0, when transmitting information corresponding to the downlink component carrier 2 through the uplink component carrier 0 (for example, when transmitting an ACK/NACK through the uplink component carrier 0 of a PDSCH of the downlink component carrier 2 or transmitting a PUSCH through the uplink component carrier 0 according to scheduling through the downlink component carrier 2). As described above, when a remnant downlink component carrier is sub-linked to an uplink component carrier, the UE of the present invention uses a cell ID of a downlink component carrier prime-linked to the uplink component carrier, so that it is possible to prevent contention between resources of cell-ID-based uplink functions.

Figure 11:
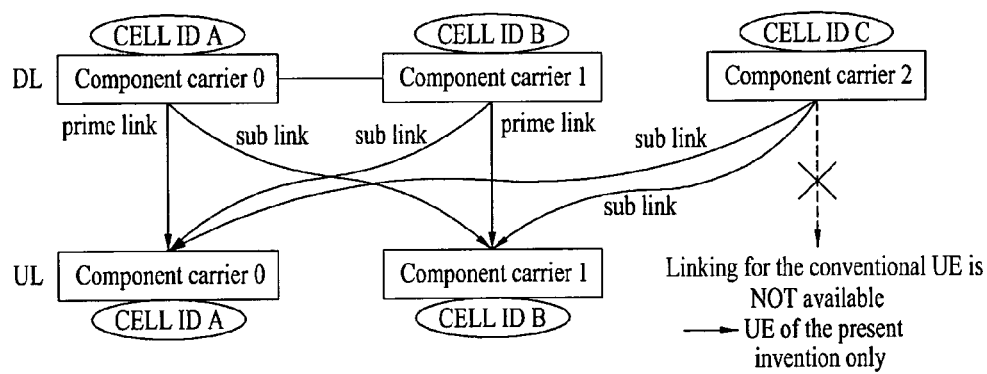
FIG. 11 illustrates a second example of the method for configuring flexible sub-links for LTE-A UEs according to an embodiment of the present invention.

The following is a description of a second example of the flexible sub-link configuration method. FIG. 11 illustrates the second example of the method for configuring flexible sub-links for UEs of the present invention according to an embodiment of the present invention. In the case of FIG. 11, the number of downlink component carriers is 3 and the number of uplink component carriers is 2 such that the downlink and uplink component carriers are asymmetric.

The configuration of FIG. 11 is identical to that of FIG. 10, except that the downlink component carrier 0 and the downlink component carrier 1 can be sub-linked respectively to the uplink component carrier 1 and the uplink component carrier 0. For example, in the case where the downlink component carrier 0 is sub-linked to the uplink component carrier 1, the UE uses the cell ID B of the downlink component carrier 1 prime-linked to the uplink component carrier 1, instead of using the cell ID A of the downlink component carrier 0, when transmitting information corresponding to the downlink component carrier 0 through the uplink component carrier 1. Similarly, in the case where the downlink component carrier 1 is sub-linked to the uplink component carrier 0, the UE uses the cell ID A of the downlink component carrier 0 prime-linked to the uplink component carrier 0, instead of using the cell ID B of the downlink component carrier 1, when transmitting information corresponding to the downlink component carrier 1 through the uplink component carrier 0.

As described above, when a remnant downlink component carrier is sub-linked to an uplink component carrier, the UE uses a cell ID of a downlink component carrier prime-linked to the uplink component carrier, so that it is possible to prevent contention between resources of cell-ID-based uplink functions.

The following is a description of a method for configuring fixed sub-links.

Figure 12:
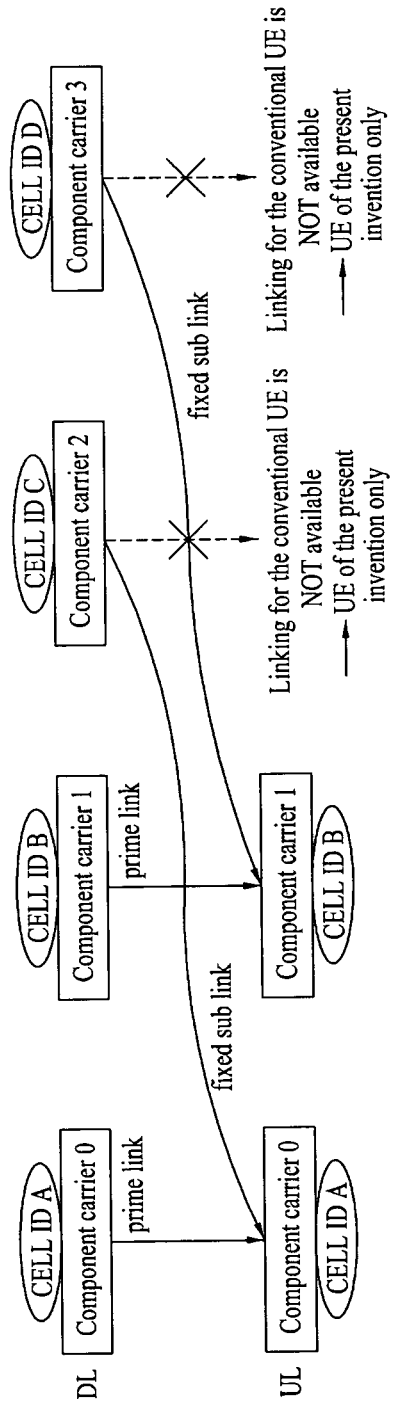
FIG. 12 illustrates an example of the method for configuring fixed sub-links for LTE-A UEs according to an embodiment of the present invention.

FIG. 12 illustrates an example of the method for configuring fixed sub-links for the UEs of the present invention according to an embodiment of the present invention. In the case of FIG. 12, the number of downlink component carriers is 4 and the number of uplink component carriers is 2 such that the downlink and uplink component carriers are asymmetric. In the fixed sub-link configuration method, a remnant downlink component carrier is linked to a specific uplink component carrier, regardless of load of the uplink component carrier.

In addition, as shown in FIG. 12, a downlink component carrier 0 and a downlink component carrier 1 are linked respectively to an uplink component carrier 0 and an uplink component carrier 1 and the links can be defined as prime links for both the conventional UEs and the UEs of the present invention. A base station broadcasts each neighboring downlink component carrier and a prime link of each downlink component carrier using an EARFCN. The UE that uses an uplink component carrier can use a cell ID of a downlink component carrier prime-linked to the uplink component carrier.

In the example of FIG. 12, a downlink component carrier 2 and a downlink component carrier 3 are remnant downlink component carriers since they have no corresponding uplink component carriers. The downlink component carrier 2 and the downlink component carrier 3 can be fixedly sub-linked to uplink component carriers. Specifically, the downlink component carrier 2 is sub-linked to the uplink component carrier 0 and the downlink component carrier 3 is sub-linked to the uplink component carrier 1. Here, information of the sub-links is broadcast, as cell-common information, to all cells. When the UE of the present invention uses an uplink component carrier to which a downlink component carrier is sub-linked, the UE uses a cell ID of a downlink component carrier prime-linked to the uplink component carrier instead of using a cell ID of the downlink component carrier sub-linked to the uplink component carrier.

For example, when the UE uses the uplink component carrier 0 to which the downlink component carrier 2 is fixedly sub-linked, the UE uses a cell ID A of the downlink component carrier 0 prime-linked to the uplink component carrier 0 instead of using a cell ID C of the downlink component carrier 2. In addition, when the UE uses the uplink component carrier 1 to which the downlink component carrier 3 is fixedly sub-linked, the UE uses a cell ID B of the downlink component carrier 1 prime-linked to the uplink component carrier 1 instead of using a cell ID D of the downlink component carrier 3.

As described above, when a remnant downlink component carrier is sub-linked to an uplink component carrier, the UE uses a cell ID of a downlink component carrier prime-linked to the uplink component carrier, so that it is possible to prevent contention between resources of cell-ID-based uplink functions.

Figure 13:
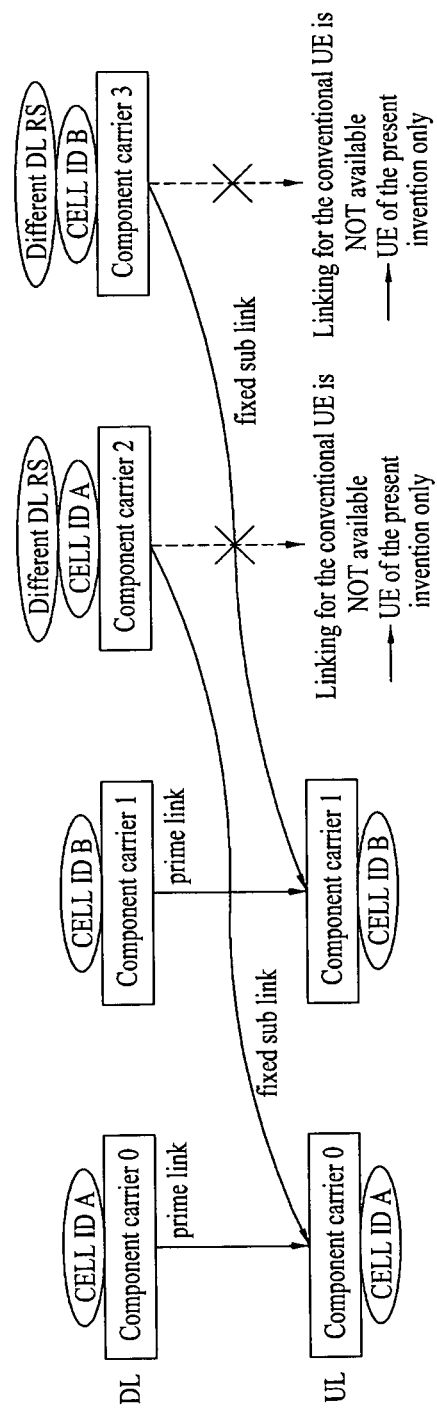
FIG. 13 illustrates another example of the method for configuring fixed sub-links for LTE-A UEs according to an embodiment of the present invention.

The following is a description of another example of the fixed sub-link configuration method. FIG. 13 illustrates another example of the method for configuring fixed sub-links for the UEs of the present invention according to an embodiment of the present invention. In the case of FIG. 13, the number of downlink component carriers is 4 and the number of uplink component carriers is 2 such that the downlink and uplink component carriers are asymmetric.

As shown in FIG. 13, different cell IDs are allocated to downlink component carriers having prime links and remnant downlink component carriers are sub-linked to specific uplink component carriers. In the example of FIG. 13, a downlink component carrier 2 and a downlink component carrier 3 are remnant downlink component carriers since they have no corresponding uplink component carriers. The downlink component carrier 2 and the downlink component carrier 3 can be fixedly sub-linked to uplink component carrier 0 and uplink component carrier 1, respectively. Here, information of the sub-links is broadcast, as cell-common information, to all cells. The cell ID of a downlink component carrier prime-linked to an uplink component carrier to which the remnant downlink component carrier is sub-linked is used as a cell ID for each remnant downlink component carrier. However, a downlink RS pattern different from that of the prime-linked downlink component carrier is used for the remnant downlink component carrier.

For example, when the downlink component carrier 2 is fixed sub-linked to the uplink component carrier 0, a cell ID A of the downlink component carrier 0 prime-linked to the uplink component carrier 0 is used as a cell ID for the downlink component carrier 2.

In addition, when the downlink component carrier 3 is fixedly sub-linked to the uplink component carrier 1, a cell ID B of the downlink component carrier 1 prime-linked to the uplink component carrier 1 is used as a cell ID for the downlink component carrier 3. However, as a downlink RS pattern for the remnant downlink component carrier, the downlink RS pattern of the downlink component carrier 2 is different from that of the downlink component carrier 0 and the downlink RS pattern of the downlink component carrier 3 is different from that of the downlink component carrier 1.

The following embodiment 2 suggests that the same cell ID be allocated to all downlink component carriers and a different time offset, time delay, or cyclic shift be assigned to each downlink component carrier to prevent an increase in the CM value.

Embodiment 2

Figure 14:
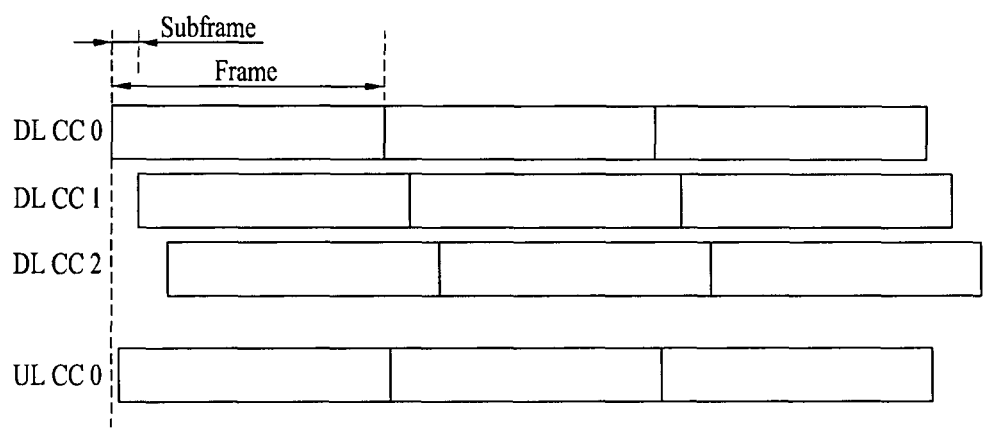
FIG. 14 illustrates the results of application of a different time offset to each downlink component carrier according to an embodiment of the present invention.

The downlink RS is repeated every frame. If frames of a number of downlink component carriers have the same start time and the same cell ID, the frames create a pattern repeated in the frequency axis, exhibiting the phenomenon of an increase in the CM value. However, if a subframe-based time offset is applied to the start time of the frame of each downlink component carrier, the downlink RS does not exhibit a repeated pattern in the frequency axis at the same time point. FIG. 14 illustrates the results of application of a different time offset to each downlink component carrier according to an embodiment of the present invention. That is, if a subframe-based time offset is applied to the start time of the frame of each of a downlink component carrier 0, a downlink component carrier 1, a downlink component carrier 2, and a downlink component carrier 3 as shown in FIG. 14, the downlink RS does not exhibit a repeated pattern in the frequency axis at the same time point, thereby preventing an increase in the CM value.

On the other hand, the present invention suggests a method in which the same cell ID is allocated to downlink component carriers and a different time delay is applied to each downlink component carrier to prevent an increase in the CM value.

In the case where the system of the present invention allocates the same cell ID to all downlink component carriers to maintain backward compatibility with the conventional system, the problem of an increase in the CM value may occur if the same downlink RS pattern is repeated in every downlink component carrier. As a method for alleviating the problem of an increase in the CM value while maintaining compatibility with the conventional system, the present invention suggests a method in which a different time delay is applied to each downlink component carrier in the time axis.

Discrete Fourier Transform (DFT) for transforming N discrete complex values $x_0, x_1, x_2, \ldots, x_{N-1}$ into complex values $X_0, X_1, X_2, \ldots, X_{N-1}$ is defined in the following Mathematical Expression 3.

$$X_k = \sum_{n=0}^{N-1} x_n e^{-\frac{2\pi i}{N}kn}, k = 0, \ldots, N-1 \quad \text{[Mathematical Expression 3]}$$

In addition, Inverse Discrete Fourier Transform (IDFT) is defined in the following Mathematical Expression 4.

$$x_n = \frac{1}{N}\sum_{k=0}^{N-1} X_k e^{\frac{2\pi i}{N}kn}, n = 0, \ldots, N-1 \quad \text{[Mathematical Expression 4]}$$

In the conventional system, OFDM is used as a multiple-frequency transmission scheme for each component carrier and, in the OFDM scheme, each subcarrier is transmitted after being IDFTed into a time sample in the time axis. Therefore, a modulation symbol transmitted through every subcarrier may be associated with $X_k$ and the time sample in the time axis may be associated with $x_n$. Since the first time sample is $$x_0 = \sum_{k}^{N-1} X_k,$$

modulation symbol values transmitted through subcarriers are summed without phase change. Accordingly, when $X_k$ values have a repeated pattern due to RS transmission of a number of downlink component carriers, a peak value is created in the corresponding sample value due to signal overlapping. This peak value causes an increase in the CM value.

Figure 15:
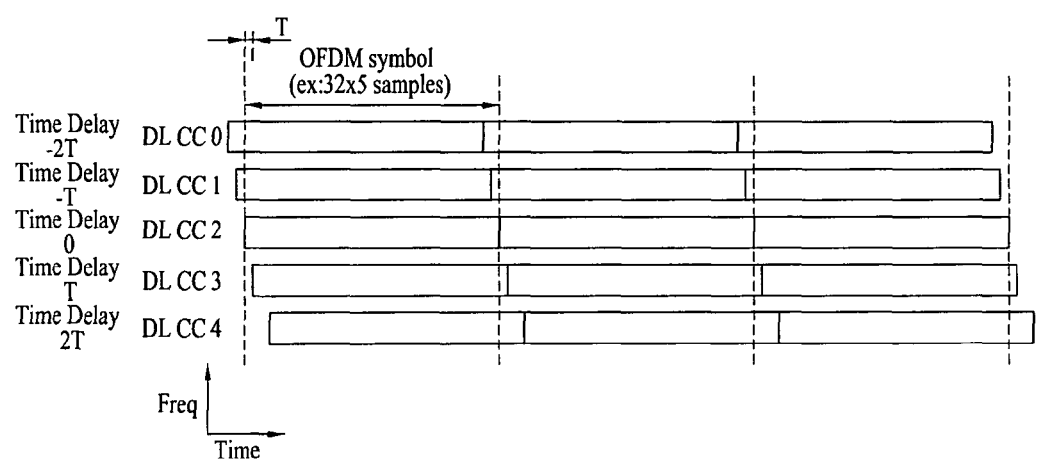
FIG. 15 illustrates the results of application of a different time delay to each downlink component carrier according to an embodiment of the present invention.

FIG. 15 illustrates the results of application of a different time delay to each downlink component carrier according to an embodiment of the present invention. As a method for preventing signal overlap, the present invention suggests a method in which a different time delay is applied to each downlink component carrier as shown in FIG. 15. A multiple of the reciprocal of the sample rate may be used as the time delay. In the case where the sample is oversampled, a multiple of the reciprocal of the oversample rate is used as the time delay. This time delay value may be set to be different for each of all aggregated component carriers or may be set to be different for each of some of the aggregated component carriers. Such time delay values may be broadcast to each UE to allow the UE to know the different time delay values of component carriers received by the UE so that the UE can accurately perform acquisition of synchronization of the component carriers and channel estimation of component carriers.

On the other hand, one may consider a method in which a cyclic shift is applied to each downlink component carrier in the time axis to prevent an increase in the CM value.

Since a data symbol transmitted through a subcarrier is IDFTed into a time-axis signal on an OFDM symbol by symbol basis, there is a problem in that, in order to apply a time delay on a sample by sample basis as described above, it is necessary to individually perform IDFT on each component carrier for conversion into a time-axis signal before applying the delay. In addition, applying a time delay to each downlink component carrier as described above causes mismatching of the boundaries of OFDM symbols.

IDFT of $X_k$ multiplied by a linear phase for $$e^{-\frac{j2\pi}{N}nm}$$

for an integer m corresponds to cyclic shift of $x_n$. That is, a relation of the following Mathematical Expression 5 is satisfied.

If $F(\{x_n\})_k =$      [Mathematical Expression 5]

$X_k$ then $F(\{x_{n-m}\})_k = X_k \cdot e^{-\frac{j2\pi}{N}nm}$

Figure 16:
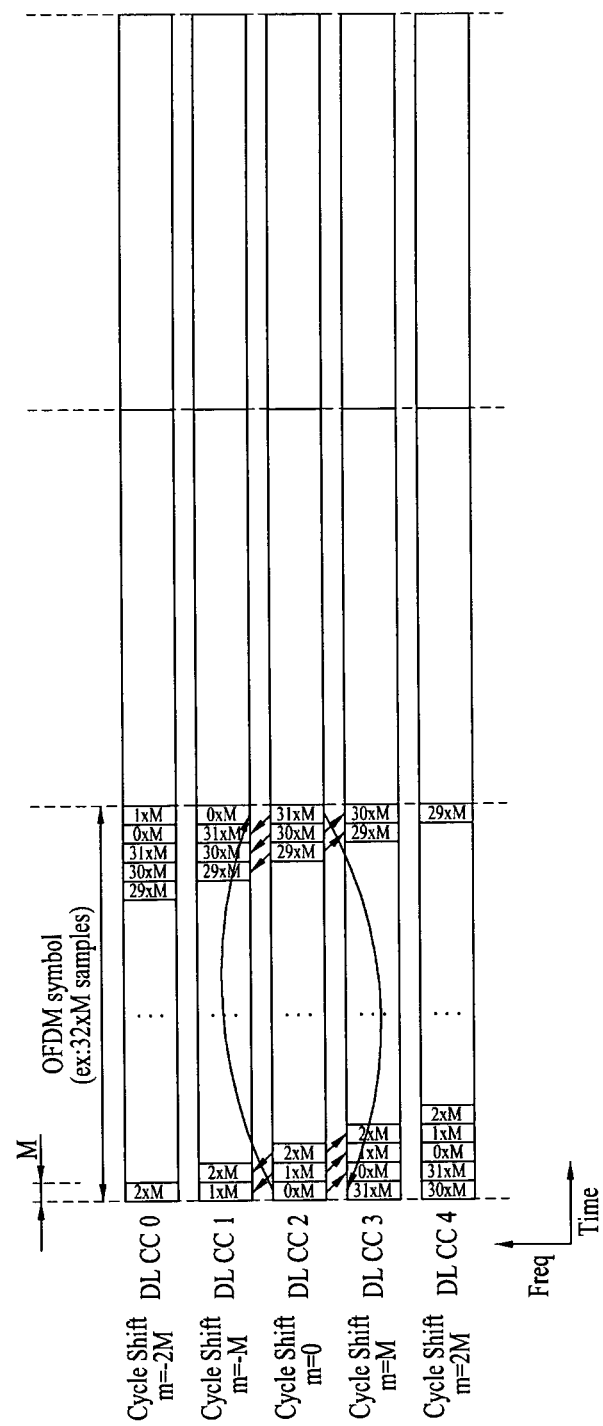
FIG. 16 illustrates the results of application of a different time delay to each downlink component carrier according to an embodiment of the present invention.

In Mathematical Expression 5, the subscript denotes a modulo operation and $\{x_n\}$ denotes a vector X. FIG. 16 illustrates the results of application of a different time delay to each downlink component carrier according to an embodiment of the present invention. The present invention suggests that a different cyclic shift be applied to each component carrier as shown in FIG. 16 so as to obtain time delay effects while achieving matching of the boundaries between OFDM symbols of component carriers. The cyclic shift value may be set to be an integer or, preferably, a multiple of the total number of component carriers. This cyclic shift value may be set to be different for each of all aggregated component carriers or may be set to be different for each of some of the aggregated component carriers. Such cyclic shift values may be broadcast to each UE to allow the UE to know the respective cyclic shift values of component carriers received by the UE so that the UE can accurately perform acquisition of synchronization of the component carriers and channel estimation of component carriers.

In the example of FIG. 16, with respect to a downlink component carrier 2, −2M is applied to a downlink component carrier 0, −M is applied to a downlink component carrier 1, M is applied to a downlink component carrier 3, and 2M is applied to a downlink component carrier 4. Here, M denotes a difference (or distance) between cyclically shifted samples of adjacent component carriers and may be an integer. When compared to FIG. 15, the time delay T can be represented such that T=M*(sampling period). Since the boundaries of OFDM symbols match, cyclic shift may be applied in such a manner that data carried in each subcarrier is multiplied by a linear phase according to the shift value of m for each component carrier in the frequency domain according to the shift theory. Accordingly, it is possible to convert modulation symbols transmitted in subcarriers of all component carriers into time-domain signals using single IDFT.

The following Table 4 illustrates comparison between CM values measured in the case where different cyclic shift values are applied when transmitting RSs having the same pattern through a number of component carriers and CM values measured in the case where different cyclic shift values are not applied.

TABLE 4

| #CC | | w/o PSF CM QPSK OFDM | | | | |
|---|---|---|---|---|---|---|
| | | 1 | 2 | 3 | 4 | 5 |
| RS only | 1Tx (w/o cyclic delay) | 4.02 | 6.57 | 8.59 | 10.13 | 11.32 |
| | 1Tx (w cyclic delay) | 4.02 | 4.95 | 5.08 | 4.75 | 4.26 |

It can be seen from Table 4 that applying cyclic shift significantly reduces the increase of the CM value.

Figure 17:
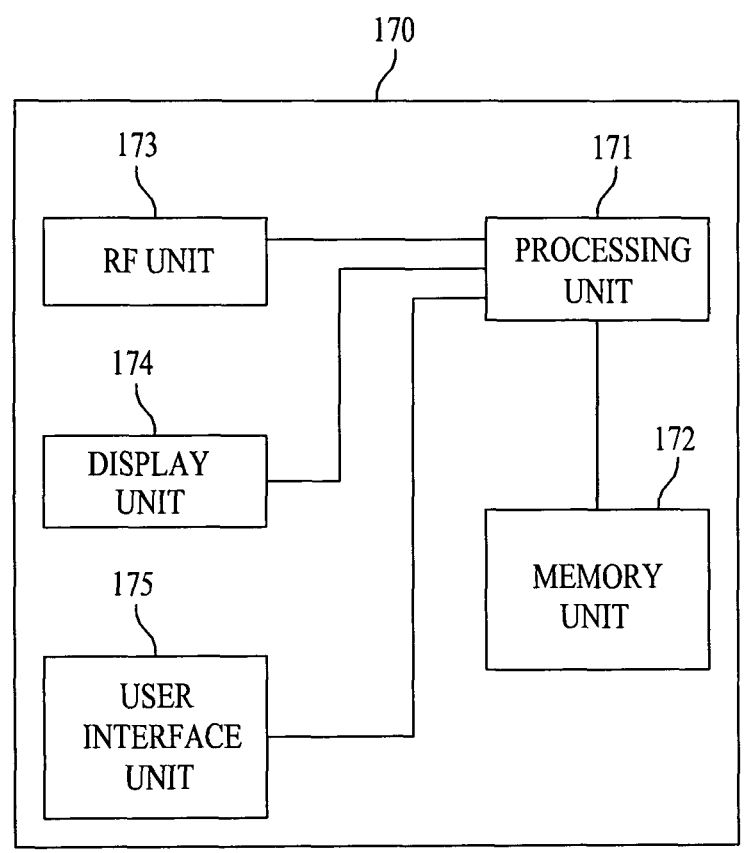
FIG. 17 is a block diagram illustrating a configuration of a device which can be applied to a UE or a base station and which can implement the present invention.

FIG. 17 is a block diagram illustrating a configuration of a device which can be applied to a UE or a base station and which can implement the present invention. As shown in FIG. 17, the device 170 includes a processing unit 171, a memory unit 172, a Radio Frequency (RF) unit 173, a display unit 174, and a user interface unit 175. The functions of a physical interface protocol layer are performed at the processing unit 171. The processing unit 171 provides a control plane and a user plane. The functions of each layer may be performed at the processing unit 171. The memory unit 172 is electrically connected to the processing unit 171 and stores an operating system, applications, and general files. If the device 170 is a UE, the display unit 154 can display a variety of information and may be implemented using a Liquid Crystal Display (LCD) or an Organic Light Emitting Diode (OLED). The user interface unit 175 can be constructed in combination with a known user interface such as a keypad or a touch screen. The RF unit 173 is electrically connected to the processing unit 171 and transmits or receives a wireless signal.

MODE FOR INVENTION

Various embodiments have been described in the best mode for carrying out the invention.

The above embodiments are provided by combining components and features of the present invention in specific forms. The components or features of the present invention should be considered optional unless explicitly stated otherwise. The components or features may be implemented without being combined with other components or features. The embodiments of the present invention may also be provided by combining some of the components and/or features. The order of the operations described above in the embodiments of the present invention may be changed. Some components or features of one embodiment may be included in another embodiment or may be replaced with corresponding components or features of another embodiment. It will be apparent that claims which are not explicitly dependent on each other can be combined to provide an embodiment or new claims can be added through amendment after this application is filed.

The embodiments of the present invention can be implemented by hardware, firmware, software, or any combination thereof. In the case where the present invention is implemented by hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case where the present invention is implemented by firmware or software, the embodiments of the present invention may be implemented in the form of modules, processes, functions, or the like which perform the features or operations described above. Software code can be stored in a memory unit so as to be executed by a processor. The memory unit may be located inside or outside the processor and can communicate data with the processor through a variety of known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced in the scope of the invention.

INDUSTRIAL APPLICABILITY

The present invention can be used for a user equipment, a base station, or other devices in a wireless mobile communication system.

The invention claimed is:

1. A method for wireless communication between a user equipment and a base station in a wireless communication system that supports a first user equipment that uses a single frequency band and a second user equipment that uses a plurality of frequency bands, the method comprising:
receiving, by the second user equipment from the base station, resource allocation information including information regarding a downlink component carrier and an uplink component carrier allocated to the user equipment;
receiving, by the second user equipment from the base station, downlink data signal through the allocated downlink component carrier; and
transmitting, by the second user equipment to the base station, uplink data signal through the allocated uplink component carrier by applying a cell ID thereto,
wherein the allocated downlink component carrier is one of a plurality of downlink component carriers to which different cell IDs are applied, a plurality of pairs of component carriers are predefined by associating a plurality of uplink component carriers respectively with a plurality of downlink component carriers in order to support the first user equipment, and, when the allocated downlink component carrier and the allocated uplink component carrier do not correspond to any pair of component carriers in the plurality of pairs of component carriers, the cell ID applied to the allocated uplink component carrier is a cell ID of a downlink component carrier that is paired with the allocated uplink component carrier in the plurality of predefined pairs of component carriers.

2. The method according to claim 1, wherein the allocated downlink component carrier is used only for the second user equipment.

3. The method according to claim 1, wherein the resource allocation information is transmitted through user-specific information.

4. The method according to claim 1, wherein
a different time offset is assigned to each of the allocated downlink component carrier to allow each of the allocated downlink component carrier to have a different start time point.

5. The method according to claim 4, wherein the time offset is in units of subframes.

6. The method according to claim 1, wherein
a different time delay is assigned to each of the allocated downlink component carrier to allow each of the allocated downlink component carrier to have a different start time point.

7. The method according to claim 6, wherein the time delay is a multiple of the reciprocal of a sample rate.

8. The method according to claim 1, wherein
a different cyclic shift is assigned to each of the allocated downlink component carrier to allow each of the allocated downlink component carrier to have a different start time point.

9. The method according to claim 8, wherein the cyclic shift is a multiple of the reciprocal of a sample rate.

* * * * *